(12) United States Patent
Tatsushima et al.

(10) Patent No.: US 11,598,483 B2
(45) Date of Patent: Mar. 7, 2023

(54) HIGH-PRESSURE VESSEL

(71) Applicant: HONDA MOTOR CO., LTD., Tokyo (JP)

(72) Inventors: Kosuke Tatsushima, Wako (JP); Kenta Umetsu, Wako (JP); Yuki Nishitarumizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/466,257

(22) Filed: Sep. 3, 2021

(65) Prior Publication Data

US 2022/0074549 A1 Mar. 10, 2022

(30) Foreign Application Priority Data

Sep. 8, 2020 (JP) .............................. JP2020-150224

(51) Int. Cl.
*F17C 1/06* (2006.01)

(52) U.S. Cl.
CPC ........ *F17C 1/06* (2013.01); *F17C 2201/0109* (2013.01); *F17C 2201/056* (2013.01); *F17C 2203/0604* (2013.01); *F17C 2203/067* (2013.01); *F17C 2209/2154* (2013.01); *F17C 2221/012* (2013.01); *F17C 2223/036* (2013.01)

(58) Field of Classification Search
CPC ................ F17C 1/06; F17C 2201/0109; F17C 2203/0604; F17C 2203/067; F17C 2209/2154; F17C 2203/0663; F17C 2203/0609; F17C 2203/0624; F17C 2203/0665

See application file for complete search history.

(56) References Cited

U.S. PATENT DOCUMENTS

| | | | |
|---|---|---|---|
| 9,879,825 B2 * | 1/2018 | Kaneko | ..................... F17C 1/06 |
| 2012/0024746 A1 * | 2/2012 | Otsubo | .................. F17C 13/06 156/187 |
| 2020/0141538 A1 * | 5/2020 | Umetsu | ..................... F17C 1/00 |

FOREIGN PATENT DOCUMENTS

JP 2020-070907 A 5/2020

* cited by examiner

*Primary Examiner* — Don M Anderson
(74) *Attorney, Agent, or Firm* — Carrier Shende & Associates, P.C.; Joseph P. Carrier; Jeffrey T. Gedeon

(57) ABSTRACT

A reinforcement layer of a high-pressure vessel has a plurality of low helical layers. In at least one of the (i−1)-th low helical layer and the i-th low helical layer, the difference between the diameter of an opening formed in an end portion of the (i−1)-th low helical layer and the diameter of an opening formed in an end portion of the i-th low helical layer is equal to or larger than the width of the band-shaped fiber when an inclination angle WA of the band-shaped fiber is equal to or smaller than a second angle smaller than a first angle.

6 Claims, 10 Drawing Sheets

WA ≒ 10°

HIGH-PRESSURE VESSEL

CROSS-REFERENCE TO RELATED APPLICATION

This application is based upon and claims the benefit of priority from Japanese Patent Application No. 2020-150224 filed on Sep. 8, 2020, the contents of which are incorporated herein by reference.

BACKGROUND OF THE INVENTION

Field of the Invention

The present invention relates to a high-pressure vessel in which a band-shaped fiber is wound around an outer wall of a liner.

Description of the Related Art

In order to cause a fuel cell to generate electricity, a fuel gas such as a hydrogen gas needs to be supplied to an anode. Therefore, for example, a fuel cell vehicle equipped with a fuel cell is equipped with a high-pressure vessel which is refilled with hydrogen gas. The high-pressure vessel includes a liner as a vessel body and a reinforcement layer surrounding an outer wall of the liner. The liner is made of a resin material such as polyamide or high-density polyethylene. The liner has a trunk portion and converging portions positioned at both ends of the trunk portion. The reinforcement layer is made of, for example, fiber reinforced plastic or resin (FRP).

The reinforcement layer is generally formed by winding a band-shaped reinforced fiber (referred to as a band-shaped fiber) impregnated with a resin around the outer wall of the liner a plurality of times and then hardening (curing) the resin by heating. Here, a hoop layer and a helical layer are formed distinctively from each other by changing the winding direction of the band-shaped fiber. From the viewpoint of sufficiently securing the pressure-resistance strength of the liner, various studies have been made on where the hoop layer and the helical layer should be formed in the reinforcement layer.

JP 2020-070907 A discloses a high-pressure vessel having a reinforcement layer divided into an inner laminated portion, an outer laminated portion, and an intermediate layer portion. The inner laminated portion is located on the inner side (liner side) of the reinforcement layer. The outer laminated portion is located outside the reinforcement layer. The intermediate layer portion is located between the inner laminated portion and the outer laminated portion. A low helical layer is laminated on the inner laminated portion and the outer laminated portion. Hoop layers and high helical layers are alternately laminated in the intermediate layer portion. The inclination angle of the band-shaped fiber with respect to the longitudinal direction of the high-pressure vessel is different between the low helical layer and the high helical layer. The inclination angle of the band-shaped fiber of the low helical layer is a predetermined angle or less. The inclination angle of the band-shaped fiber of the high helical layer is larger than a predetermined angle. The hoop layer and the high helical layer cannot cover the converging portion of the liner. On the other hand, the low helical layer can sufficiently cover the converging portion of the liner. Therefore, pressure resistance strength of the trunk portion and the converging portion is ensured.

The high-pressure vessel disclosed in JP 2020-070907 A has an inner laminated portion and an outer laminated portion as follows. In the inner laminated portion, the inclination angle of the band-shaped fiber gradually increases as the laminating order of the low helical layer advances. In the outer laminated portion, the inclination angle of the band-shaped fiber gradually decreases as the laminating order of the low helical layer advances.

SUMMARY OF THE INVENTION

Openings are formed at both ends of the low helical layer to expose the cap from the reinforcement layer. In general, the diameter of the opening increases as the inclination angle of the band-shaped fiber increases. In the inner laminated portion disclosed in JP 2020-070907 A, the inclination angle of the band-shaped fibers increases as the laminating order of the low helical layer advances. Therefore, the diameter of the opening gradually increases. Therefore, the thickness of the inner laminated portion is thinnest at a portion closest to the cap and gradually increases with distance from the cap. The thinnest portion of the inner laminated portion is referred to as a thin portion. The thickest portion of the inner laminated portion is referred to as a thick portion. When the high-pressure vessel is viewed from one side in the longitudinal direction of the high-pressure vessel, the thin portion and the thick portion are both annular. The thin portion is located between the axis of the high-pressure vessel and the thick portion.

At the converging portion, the outer laminated portion is directly laminated on the inner laminated portion. When the high-pressure vessel is viewed from one side in the longitudinal direction of the high-pressure vessel, the band-shaped fibers forming the low helical layer of the outer laminated portion cross the thick portion of the inner laminated portion. The band-shaped fiber is in contact with the fiber layer of the thick portion, but is not placed in contact with the fiber layer of the thin portion, so that the band-shaped fiber is in a floating state. Then, a gap is formed on the lower layer side of the portion where the band-shaped fiber floats. When the height difference between the thick portion and the thin portion is large, the gap becomes large. When the gap becomes large, the strength of the reinforcement layer decreases. As a result, the durability of the high-pressure vessel is degraded.

An object of the present invention is to solve the above-described problems.

According to an aspect of the present invention, there is provided a high-pressure vessel including:

a liner including a trunk portion and converging portions located at opposite ends of the trunk portion; and a plurality of fiber layers formed by winding a band-shaped fiber a plurality of times around an outer wall of the liner;

wherein the plurality of fiber layers are laminated in a direction away from the liner to thereby form a reinforcement layer, each of the fiber layers is one of a hoop layer in which the band-shaped fiber is wound around the outer wall of the liner in a hoop winding manner and a helical layer in which the band-shaped fiber is wound around the outer wall of the liner in a helical winding manner, the helical layer is one of a low helical layer in which an inclination angle of the band-shaped fiber with respect to a longitudinal direction of the trunk portion is equal to or smaller than a first angle and a high helical layer in which the inclination angle of the band-shaped fiber with respect to the longitudinal direction of the trunk portion is larger than the first angle, the reinforcement layer includes a plurality of the low helical layers, and in at least one of the (i−1)-th low helical layer and the i-th low helical layer, when the inclination angle of the band-shaped fiber is equal to or less than a second angle (<the first angle), a difference between a diameter of an opening formed in an end portion of the (i−1)-th low helical layer and a diameter of an opening formed in an end portion of the i-th low helical layer is equal to or greater than a width of the band-shaped fiber.

According to the present invention, it is possible to suppress deterioration of durability performance of a high-pressure vessel.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

[1. Structure of High-Pressure Vessel 10]

Figure 1:
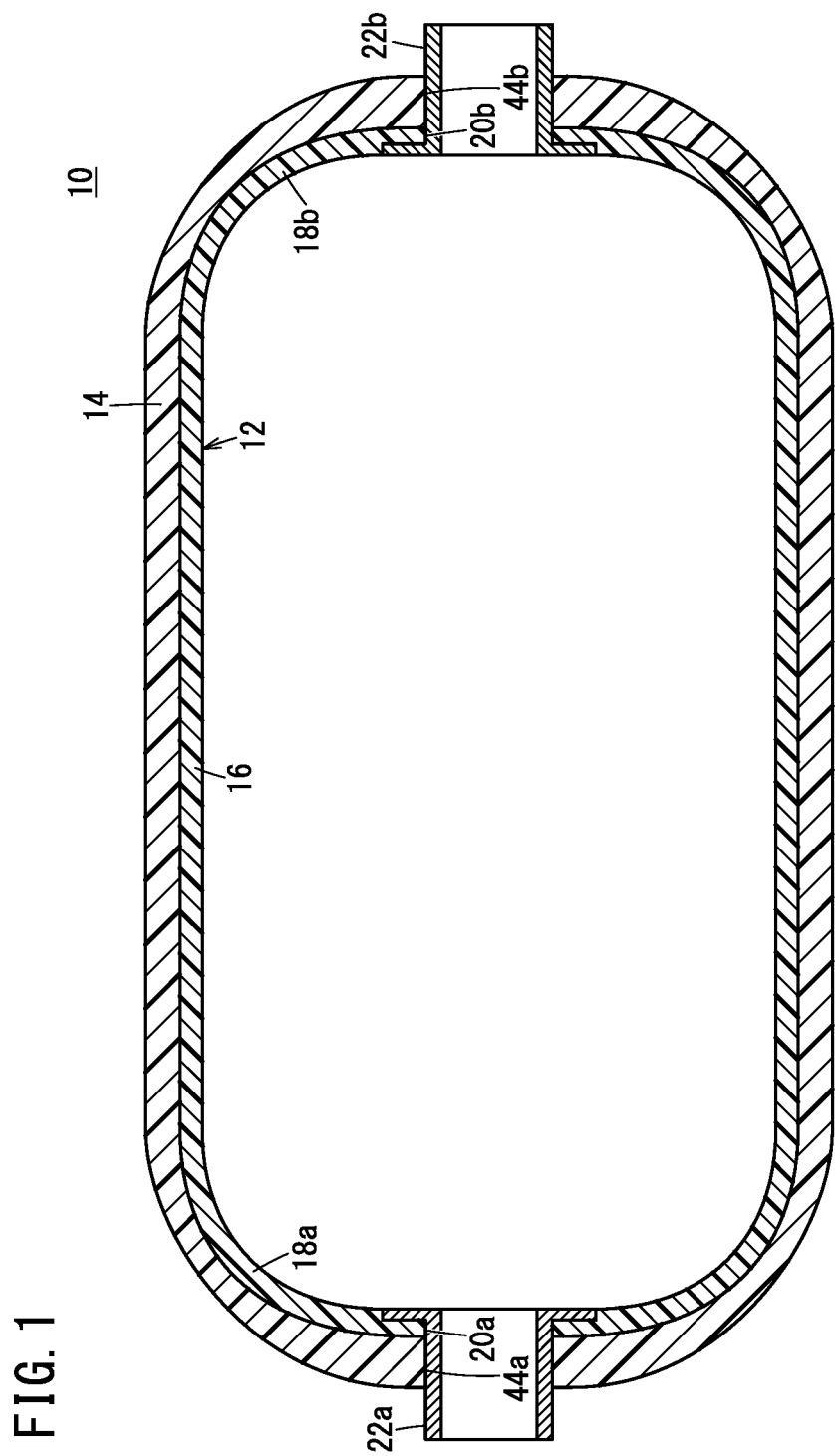
FIG. 1 is a schematic overall cross-sectional view along the longitudinal direction of the high-pressure vessel according to the present embodiment.

FIG. 1 is a schematic overall cross-sectional view along the longitudinal direction of a high-pressure vessel 10 according to the present embodiment. The high-pressure vessel 10 is mounted on a fuel cell vehicle together with a fuel cell, for example. The high-pressure vessel 10 is filled at high pressure with hydrogen gas to be supplied to the anode of the fuel cell.

The high-pressure vessel 10 has a liner 12 and a reinforcement layer 14 that covers the liner 12. The liner 12 is made of, for example, a high-density polyethylene (HDPE) resin having hydrogen barrier properties. In this case, since the HDPE resin is inexpensive and easy to process, there is an advantage that the liner 12 can be easily manufactured at low cost. In addition, since the HDPE resin is excellent in strength and rigidity, sufficient pressure resistance is ensured for the liner 12.

The liner 12 has a hollow trunk portion 16, a first dome portion 18a connected to a first end portion of the trunk portion 16, and a second dome portion 18b connected to a second end portion of the trunk portion 16. The trunk portion 16 is substantially cylindrical. Each of the first dome portion 18a and the second dome portion 18b is a converging portion that gradually converges toward the axial line of the high-pressure vessel 10 with distance from the trunk portion 16 along the axial line. In the present embodiment, each of the inner diameter of the trunk portion 16 and the outer diameter of the trunk portion 16 is substantially constant from the first end portion to the second end portion. Each of the inner diameter of the trunk portion 16 and the outer diameter of the trunk portion 16 may decrease or increase in diameter from the first end portion to the second end portion.

An opening 20a is formed in the first dome portion 18a. An opening 20b is formed in the second dome portion 18b. The opening 20a is provided with a cap 22a. The opening 20b is provided with a cap 22b. Each of the cap 22a and the cap 22b is connected to a pipe (not shown) in order to supply hydrogen gas to the anode or to resupply hydrogen gas from a hydrogen supply source. The tip of the cap 22a and the tip of the cap 22b are each exposed from the reinforcement layer 14.

Figure 2:
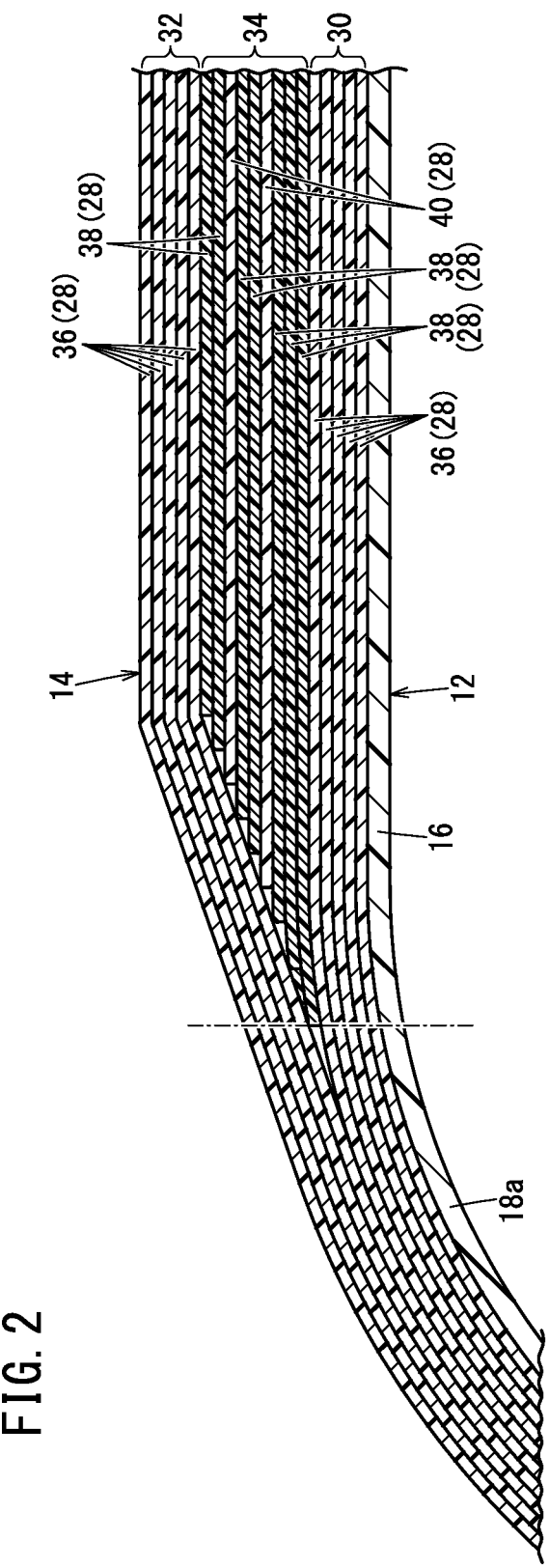
FIG. 2 is an enlarged cross-sectional view of a main part showing details of the reinforcement layer.
Figure 3:
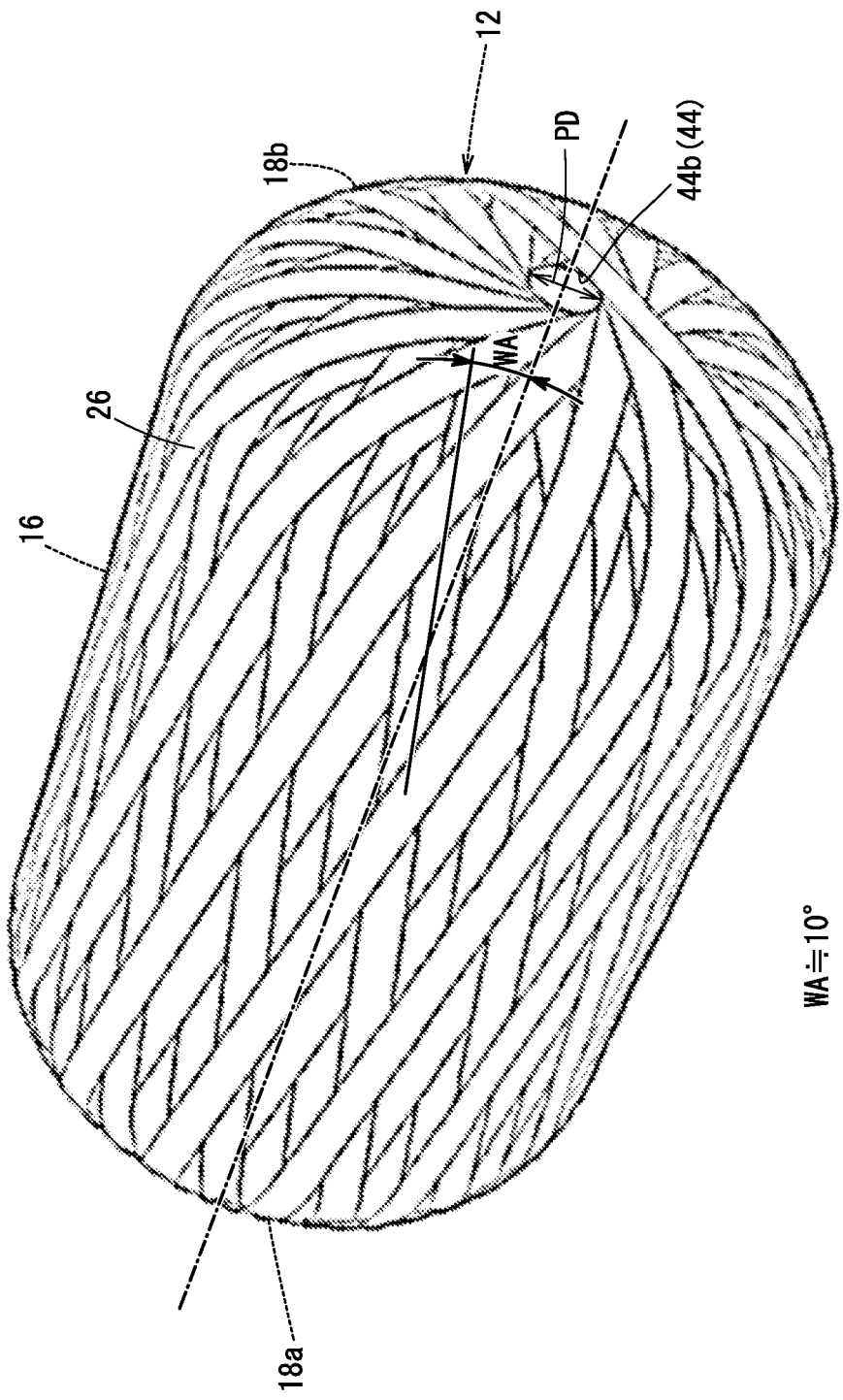
FIG. 3 is a schematic perspective view showing a state in which a band-shaped fiber is wound around a liner by low helical winding at an inclination angle of 10°.
Figure 4:
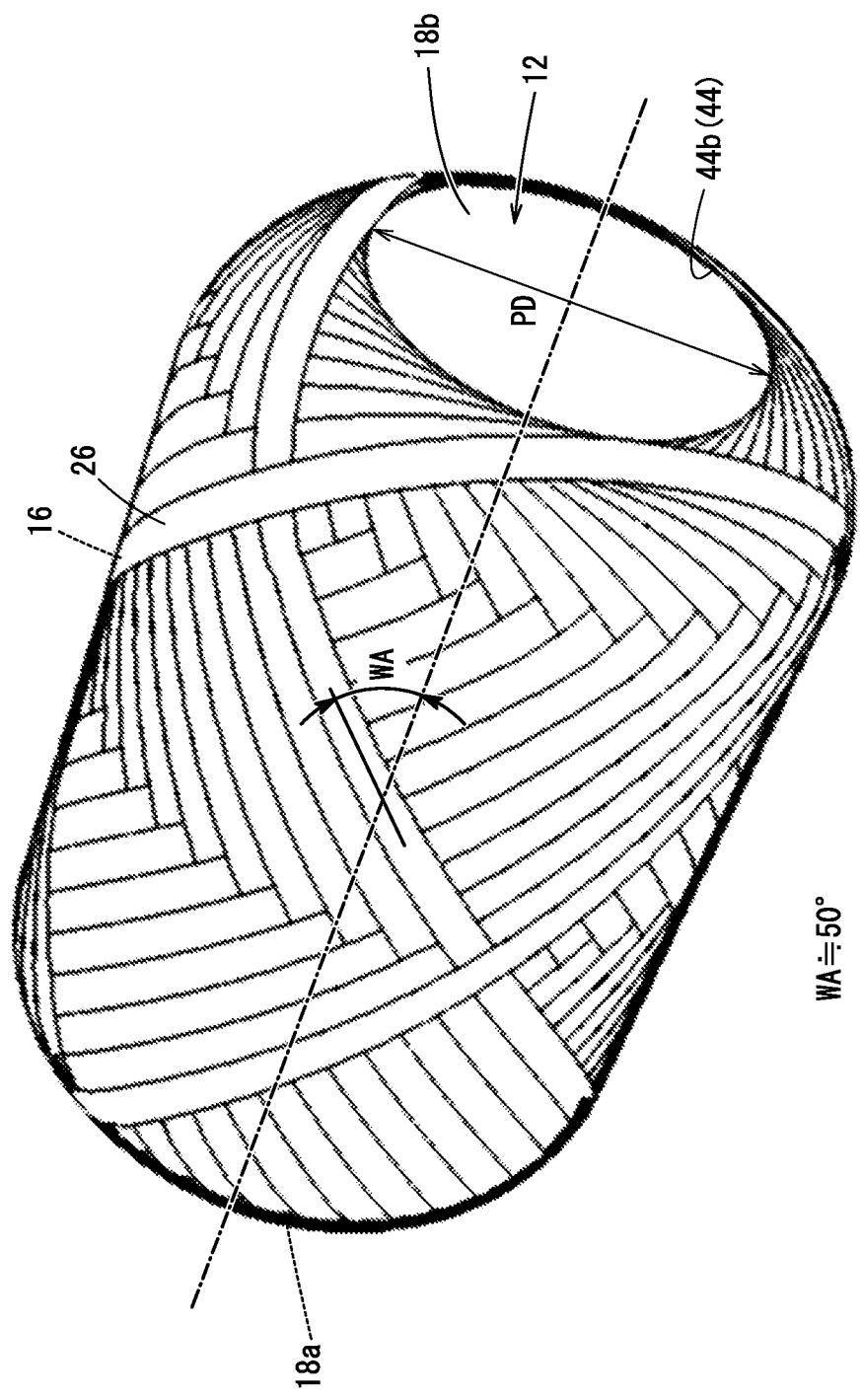
FIG. 4 is a schematic perspective view showing a state in which a band-shaped fiber is wound around a liner by low helical winding at an inclination angle of 50°.

The reinforcement layer 14 is formed of a fiber reinforced resin (FRP) in which reinforced fibers are impregnated with a resin base material. In the present embodiment, a band-shaped reinforced fiber impregnated with a resin is used. This reinforced fiber is referred to as a band-shaped fiber 26 (FIGS. 3 and 4). The reinforcement layer 14 is a laminated body formed by winding the band-shaped fiber 26 a plurality of times by a known filament winding method and then hardening (curing) the resin by heating, for example. That is, the reinforcement layer 14 is composed of a plurality of fiber layers 28 laminated in a direction away from the liner 12. As shown in FIG. 2, the reinforcement layer 14 includes an inner laminated portion 30, an outer laminated portion 32, and an intermediate laminated portion 34. The inner laminated portion 30 is located on the inner peripheral side of the reinforcement layer 14. The inner laminated portion 30 includes the beginning of the winding of the band-shaped fiber 26. The outer laminated portion 32 is located on the outer peripheral side of the reinforcement layer 14. The outer laminated portion 32 includes the end of the winding of the band-shaped fiber 26. The intermediate laminated portion 34 is interposed between the inner laminated portion 30 and the outer laminated portion 32. An alternate long and short dash line in FIG. 2 indicates a boundary between the first dome portion 18a and the trunk portion 16.

Each of the inner laminated portion 30 and the outer laminated portion 32 is a laminated body of a fiber layer 28 formed by low helical winding of the band-shaped fiber 26 (the thus-formed fiber layer will be referred to as a low helical layer 36). As shown in FIGS. 3 and 4, the helical winding is a winding method in which the band-shaped fiber 26 is wound such that the extending direction thereof is inclined at a predetermined inclination angle WA with respect to the longitudinal direction of the trunk portion 16 of the liner 12. In the present specification, "low helical winding" refers to a winding method in which the inclination angle WA is equal to or less than a first angle. For example, the first angle is about 60°. FIG. 3 illustrates a case where the inclination angle WA is about 10°. FIG. 4 illustrates a case where the inclination angle WA is about 50°. The low helical layer 36 ensures the pressure resistance strength of the first dome portion 18a and the second dome portion 18b.

The intermediate laminated portion 34 is a mixed laminated body of a hoop layer 38 and a high helical layer 40. The hoop layer 38 is formed by hoop-winding the band-shaped fiber 26. The high helical layer 40 is formed by highly helically winding the band-shaped fiber 26 (high helical winding). The hoop winding is a winding method in which the band-shaped fiber 26 is wound such that the extending direction thereof is substantially orthogonal to the longitudinal direction of the trunk portion 16 of the liner 12. In the present specification, "high helical winding" refers to a winding method in which the inclination angle WA is larger than the first angle. The pressure resistance strength of the trunk portion 16 is ensured by the intermediate laminated portion 34, particularly by the hoop layer 38.

In the present specification, the laminating order of the individual fiber layer 28 (i.e., the first laminated fiber layer, the second laminated fiber layer, . . . ) is represented by n. The laminating order n is a number (natural number) assigned to each fiber layer 28 in order from the lowermost fiber layer toward the upper fiber layer. In the present specification, a layer formed by continuously winding the band-shaped fiber 26 at the same inclination angle WA with respect to the longitudinal direction of the liner 12 is regarded as one fiber layer 28. That is, the inclination angle WA is different between the (i−1)-th low helical layer 36 and the i-th low helical layer 36.

[2. Opening 44 of Low Helical Layer 36]

As shown in FIGS. 1, 3, and 4, openings 44a and 44b are formed at both ends of the reinforcement layer 14. The caps 22a and 22b are arranged inside the openings 44a and 44b. Hereinafter, the openings 44a and 44b are collectively referred to as an opening 44. Each low helical layer 36 has an opening 44 of a specific diameter PD. As shown in FIGS. 3 and 4, the diameter PD of the opening 44 increases as the inclination angle WA increases.

The reinforcement layer 14 of the conventional high-pressure vessel 10' (FIG. 8) includes a large gap 60 (FIG. 8) around the opening 44. According to the study of the present inventors, it has been found that when the low helical layer 36 satisfies the following conditions, the gap 60 around the opening 44 is reduced.

<Conditions>

In at least one of the (i−1)-th low helical layer 36 and the i-th low helical layer 36, the difference between the diameter $PD_{i-1}$ and the diameter $PD_i$ is equal to or greater than the width $BW_i$ of the band-shaped fiber 26 when the inclination angle WA of the band-shaped fiber 26 is a second angle. The diameter $PD_{i-1}$ is the diameter of the opening 44 of the (i−1)-th low helical layer 36. The diameter $PD_i$ is the diameter of the opening 44 of the i-th low helical layer 36. The width $BW_i$ is the band width of the band-shaped fiber 26. The second angle is smaller than the first angle. In the present embodiment, the second angle is 35° or less. This condition is expressed by the following inequality (1).

Although the width $BW_i$ of the band-shaped fiber 26 is generally constant, the width $BW_i$ may be different in each layer.

$$|PD_i - PD_{i-1}| \geq BW_i \qquad (1)$$

Under the above conditions, the (i−1)-th low helical layer 36 and the i-th low helical layer 36 may be two low helical layers 36 that are continuously laminated. Under the above conditions, the (i−1)-th low helical layer 36 and the i-th low helical layer 36 may be two low helical layers 36 that are laminated via one or more fiber layers 28 other than the low helical layer 36.

The diameter $PD_i$ of the opening 44 of the i-th low helical layer 36 is expressed by the following equation (2). $OD_i$ in the following equation (2) is the outer diameter of the i-th low helical layer 36.

$$PD_i \approx OD_i \sin WA_i - BW_i \qquad (2)$$

As can be seen from the above equation (2), the diameter $PD_i$ of the opening 44 of the i-th low helical layer 36 is determined by the outer diameter $OD_i$ of the i-th low helical layer 36, the width $BW_i$ of the band-shaped fiber 26, and the inclination angle $WA_i$ of the band-shaped fiber 26.

The total number of fiber layers 28 and the inclination angle WA of the band-shaped fiber 26 forming each fiber layer 28 are determined at the design stage of the high-pressure vessel 10. The total number of fiber layers 28 is the sum of the total number of low helical layers 36, the total number of hoop layers 38, and the total number of high helical layers 40. On the other hand, the laminating order n of the low helical layer 36 is determined as follows.

First, the inclination angle WA of the band-shaped fiber 26 forming the (i−1)-th low helical layer 36 is selected from predetermined inclination angles WA. Next, the diameter $PD_i$ of the opening 44 of the i-th low helical layer 36 that satisfies the above condition with respect to the (i−1)-th low helical layer 36 is calculated from the above inequality (1). Further, the inclination angle WA of the band-shaped fiber 26 for achieving the calculated diameter $PD_i$ of the opening 44 of the i-th low helical layer 36 is calculated from the above equation (2). Then, the angle close to the calculated inclination angle WA is selected from the predetermined inclination angles WA, and is set as the inclination angle WA of the band-shaped fiber 26 forming the i-th low helical layer 36.

[3. Comparison Between Conventional High-Pressure Vessel 10' and High-Pressure Vessel 10 of the Present Embodiment]

Figure 5:
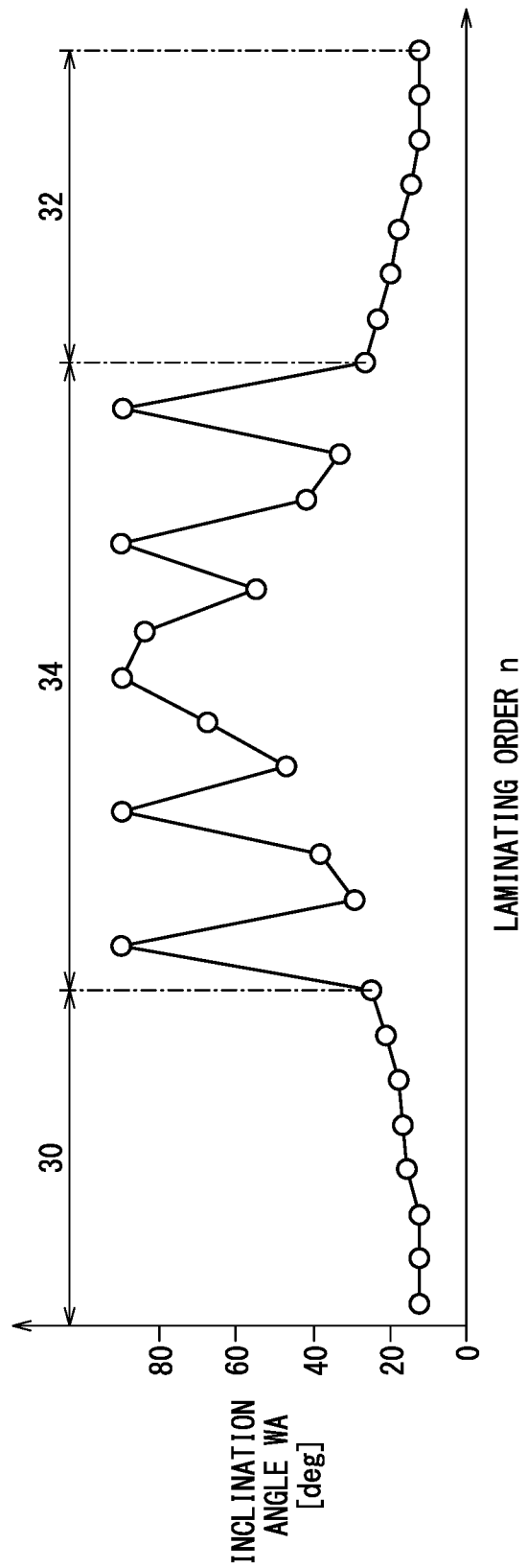
FIG. 5 is a graph showing the relationship between the laminating order of fiber layers and the inclination angle of the band-shaped fibers forming the fiber layers in a conventional high-pressure vessel.
Figure 6:
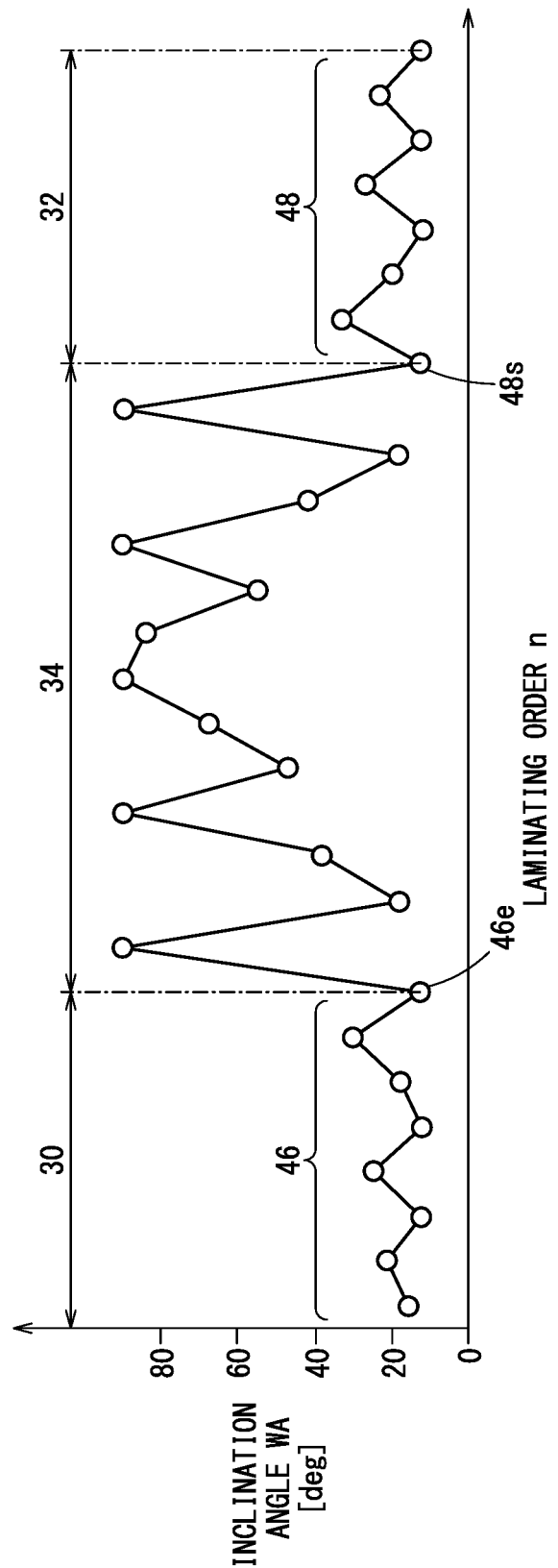
FIG. 6 is a graph showing the relationship between the laminating order of the fiber layers and the inclination angle of the band-shaped fibers forming the fiber layers in the high-pressure vessel according to the present embodiment.

FIGS. 5 and 6 are graphs showing the relationship between the laminating order n of the fiber layer 28 and the inclination angle WA of the band-shaped fiber 26 forming the fiber layer 28. FIG. 5 is a graph of a conventional high-pressure vessel 10'. FIG. 6 is a graph of the high-pressure vessel 10 according to the present embodiment. In FIGS. 5 and 6, the laminating order n increases from left to right.

In the inner laminated portion 30 shown in FIG. 5, the inclination angle WA gradually increases as the laminating order n advances (increases). In the outer laminated portion 32 shown in FIG. 5, the inclination angle WA gradually decreases as the laminating order n increases. On the other hand, in the inner laminated portion 30 and the outer laminated portion 32 shown in FIG. 6, the increase and decrease of the inclination angle WA are repeated at random as the laminating order n increases. This means that the diameter $PD_i$ of the opening 44 of the i-th low helical layer 36 is adjusted with respect to the diameter $PD_{i-1}$ of the opening 44 of the (i−1)-th low helical layer 36 based on the above conditions.

Figure 7:
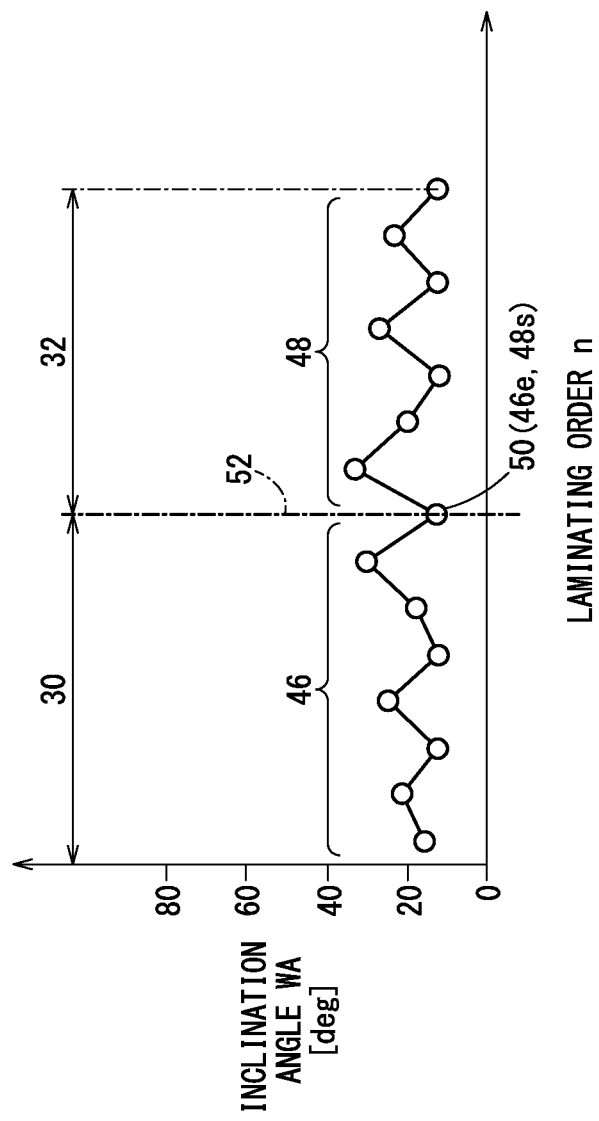
FIG. 7 is a graph obtained by extracting the inner laminated portion and the outer laminated portion from FIG. 6.

FIG. 7 is a graph obtained by extracting the inner laminated portion 30 and the outer laminated portion 32 from FIG. 6. Here, a section indicating a change in the inclination angle WA of the inner laminated portion 30 is referred to as an inner section 46, and another section indicating a change in the inclination angle WA of the inner laminated portion 30 is referred to as an outer section 48. As shown in FIG. 7, when the inner section 46 and the outer section 48 are connected such that the end point 46e of the inner section and the start point 48s of the outer section coincide with each other, the inner section 46 and the outer section 48 are substantially line-symmetric with respect to a straight line 52 passing through the coincident point 50 and parallel to the vertical axis. This means that the change in the inclination angle WA in the case where the laminating order n goes back (decreases) from the position of the outermost periphery of the inner laminated portion 30 substantially coincides with the change in the inclination angle WA in the case where the laminating order n goes forward (increases) from the position of the innermost periphery of the outer laminated portion 32.

Figure 8:
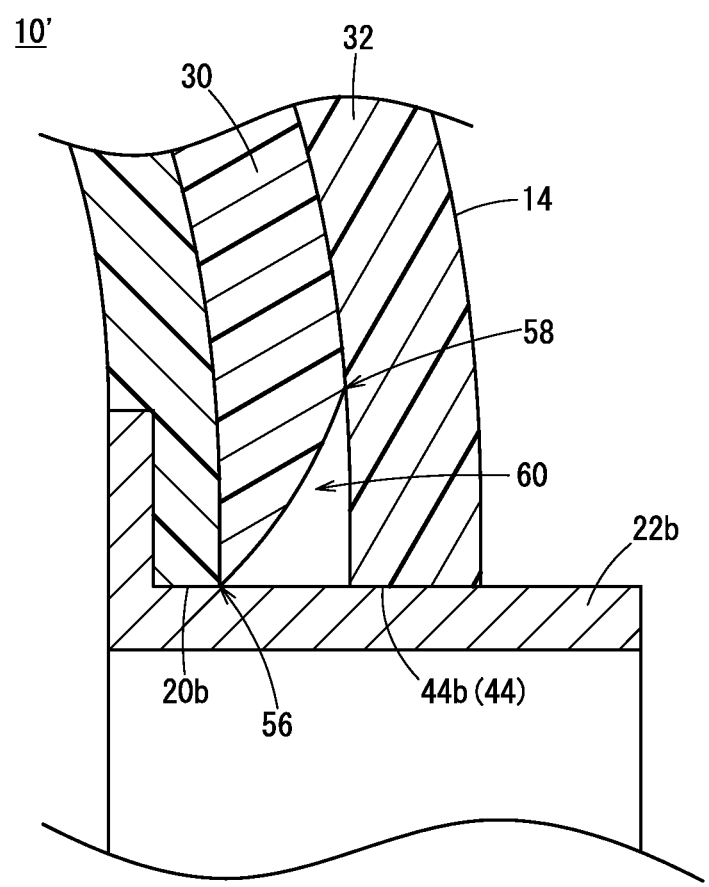
FIG. 8 is a schematic cross-sectional view showing the periphery of a cap of a conventional high-pressure vessel.

FIG. 8 is a schematic cross-sectional view showing the periphery of a cap 22b of a conventional high-pressure vessel 10'. As shown in FIG. 5, in the inner laminated portion 30 of the high-pressure vessel 10', the inclination angle WA of the band-shaped fiber 26 gradually increases as the laminating order n of the low helical layer 36 advances (increases). According to this winding method, as shown in FIG. 8, the diameter PD of the opening 44b of the inner laminated portion 30 gradually increases as the low helical layer 36 is laminated. As a result, a thin portion 56 and a thick portion 58 are formed in the inner laminated portion 30.

Figure 9:
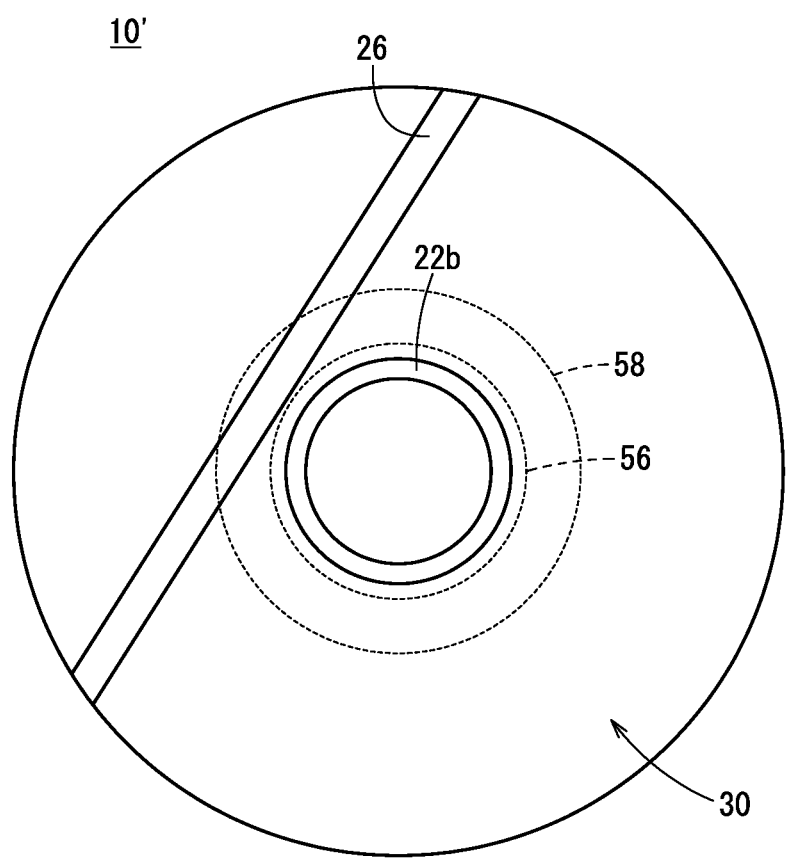
FIG. 9 is a schematic view showing a conventional inner laminated portion viewed from one side in the longitudinal direction.

As shown in FIG. 9, the thin portion 56 is positioned inside the thick portion 58 when viewed from one side in the longitudinal direction of the high-pressure vessel 10'. When the outer laminated portion 32 is laminated on the inner laminated portion 30, the band-shaped fibers 26 of the outer laminated portion 32 cross the thick portion 58. A portion of the band-shaped fiber 26 that crosses the thin portion 56 is in a floating state. Therefore, as shown in FIG. 8, a large gap 60 is formed between the inner laminated portion 30 and the outer laminated portion 32. The large gap 60 is not filled even when the outer laminated portion 32 is laminated. Therefore, the reinforcement layer 14 finally formed includes a large gap 60 around the cap 22b. Similarly, the reinforcement layer 14 includes a large gap 60 around the cap 22a.

Figure 10:
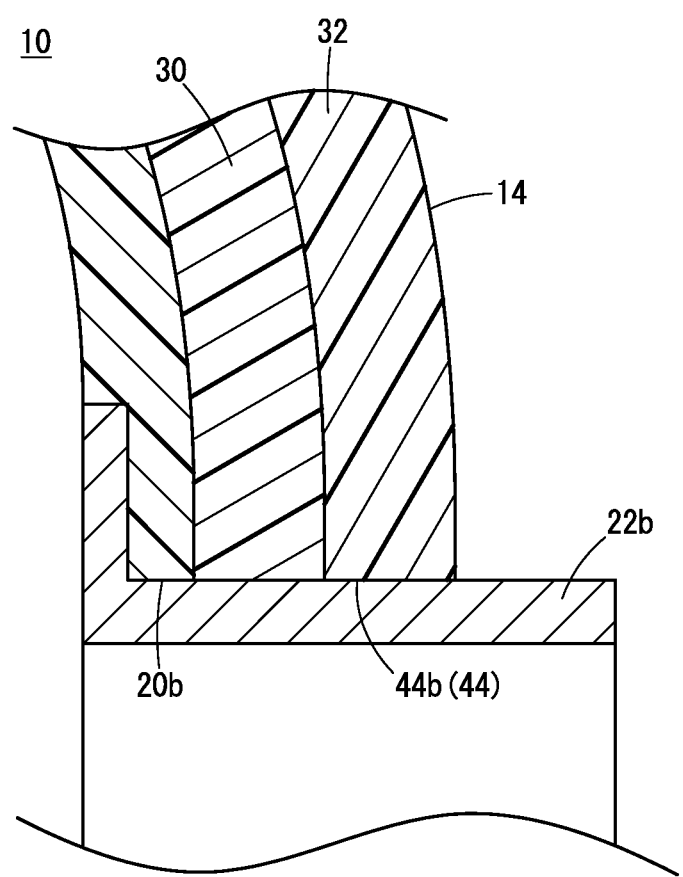
FIG. 10 is a schematic cross-sectional view showing the periphery of the cap of the high-pressure vessel according to the present embodiment.

On the other hand, FIG. 10 is a cross-sectional view schematically showing the cap 22b of the high-pressure vessel 10 according to the present embodiment. As shown in FIG. 6, in the inner laminated portion 30 of the high-pressure vessel 10, the increase and decrease of the inclination angle WA of the band-shaped fiber 26 are repeated at random as the laminating order n of the low helical layer 36 advances. According to this winding method, the low helical layer 36 having a larger diameter PD of the opening 44 and the low helical layer 36 having a smaller diameter PD of the opening 44 are randomly laminated. As a result, as shown in FIG. 10, the inner laminated portion 30 does not contain any pronounced thin portion 56 or thick portion 58. Therefore, even if the outer laminated portion 32 is laminated on the inner laminated portion 30, a large gap 60 (FIG. 8) is not formed between the inner laminated portion 30 and the outer laminated portion 32. Therefore, the reinforcement layer 14 finally formed does not include a large gap 60 around the cap 22b (and the cap 22a).

[4. Technical Concept Obtained from Embodiment]

A description will be given below concerning the technical concepts that can be grasped from the above-described embodiment.

According to an aspect of the present invention, there is provided a high-pressure vessel 10 including:

a liner 12 including a trunk portion 16 and converging portions (a first dome portion 18a and a second dome portion 18b) located at opposite ends of the trunk portion 16;

a plurality of fiber layers 28 formed by winding a band-shaped fiber 26 a plurality of times around an outer wall of the liner 12;

wherein the plurality of fiber layers 28 are laminated in a direction away from the liner 12 to thereby form a reinforcement layer 14, each of the fiber layers 28 is one of a hoop layer 38 in which the band-shaped fiber 26 is wound around the outer wall of the liner 12 in a hoop winding manner and a helical layer in which the band-shaped fiber 26 is wound around the outer wall of the liner 12 in a helical winding manner, the helical layer is one of a low helical layer 36 in which an inclination angle WA of the band-shaped fiber 26 with respect to the longitudinal direction of the trunk portion 16 is equal to or smaller than a first angle and a high helical layer 40 in which the inclination angle WA of the band-shaped fiber 26 with respect to the longitudinal direction of the trunk portion 16 is larger than the first angle, the reinforcement layer 14 includes a plurality of the low helical layers 36, and in at least one of the (i−1)-th low helical layer 36 and the i-th low helical layer 36, when the inclination angle WA of the band-shaped fiber 26 is equal to or less than a second angle (<the first angle), the difference between the diameter $PD_{i-1}$ of the opening 44 formed in the end portion of the (i−1)-th low helical layer 36 and the diameter $PD_i$ of the opening 44 formed in the end portion of the i-th low helical layer 36 is equal to or larger than the width $BW_i$ of the band-shaped fiber 26

In the above configuration, a predetermined "condition" is established between the (i−1)-th low helical layer 36 and the i-th low helical layer 36. When this "condition" is satisfied, no significant thickness difference occurs in the inner laminated portion 30. That is, the inner laminated portion 30 does not contain any pronounced thin portion 56 or thick portion 58. Therefore, even if the outer laminated portion 32 is laminated on the inner laminated portion 30, a large gap 60 is not formed between the inner laminated portion 30 and the outer laminated portion 32. Therefore, the reinforcement layer 14 finally formed does not include any large gap 60. As described above, according to the above-described configuration, since the gap 60, which becomes a factor of deteriorating the durability performance of the high-pressure vessel 10, is suppressed, it is possible to suppress deterioration of the durability performance of the high-pressure vessel 10.

In the aspect of the present invention, the (i−1)-th low helical layer 36 and the i-th low helical layer 36 may be continuously laminated.

In the aspect of the present invention, the (i−1)-th low helical layer 36 and the i-th low helical layer 36 may be laminated via one or more fiber layers 28 that do not contain any low helical layer 36.

In the aspect of the present invention, the diameter PD of the opening 44 formed in the end portion of the low helical layer 36 may be determined by the inclination angle WA of the band-shaped fiber 26.

In the aspect of the present invention, the reinforcement layer 14 may include an inner laminated portion 30 on the inner peripheral side of the reinforcement layer 14, the inner laminated portion being formed by mainly laminating the plurality of low helical layers 36, and an outer laminated portion 32 on the outer peripheral side of the reinforcement layer 14, the outer laminated portion being formed by mainly laminating the plurality of low helical layers 36, the inner laminated portion 30 includes a beginning of winding of the band-shaped fiber 26 around the liner 12, the outer laminated portion 32 includes an end of winding of the band-shaped fiber 26 around the liner 12, and an intermediate laminated portion 34 formed by laminating at least one of the high helical layer 40 and the hoop layer 38 is provided between the inner laminated portion 30 and the outer laminated portion 32.

In the aspect of the present invention, in a graph in which the horizontal axis represents the laminating order n of the fiber layer 28 and the vertical axis represents the inclination angle WA of the band-shaped fiber 26 forming the fiber layer 28, when an inner section 46 of the graph and an outer section 48 of the graph are connected in a manner that an end point 46e of the inner section and a start point 48s of the outer section coincide with each other, the inner section 46 and the outer section 48 are substantially line-symmetric about a straight line 52 passing through a coincident point 50 of the end point 46e and the start point 48s and which is parallel to the vertical axis, therein the inner section indicates a change in the inclination angle WA due to a change in the laminating order n of the inner laminated portion 30, and the outer section indicates a change in the inclination angle WA due to a change in the laminating order n of the outer laminated portion 32.

The high-pressure vessel according to the present invention is not limited to the above-described embodiment, and various configurations can be adopted without departing from the essence and gist of the present invention.

For example, the high-pressure vessel may be used for a purpose other than mounting on a fuel cell vehicle.

What is claimed is:

1. A high-pressure vessel comprising:
a liner including a trunk portion and converging portions located at opposite ends of the trunk portion; and
a plurality of fiber layers formed by winding a band-shaped fiber a plurality of times around an outer wall of the liner;
wherein the plurality of fiber layers are laminated in a direction away from the liner to thereby form a reinforcement layer,
the plurality of fiber layers include a plurality of hoop layers and a plurality of helical layers with each of the fiber layers being one of the hoop layer in which the band-shaped fiber is wound around the outer wall of the liner in a hoop winding manner and the helical layer in which the band-shaped fiber is wound around the outer wall of the liner in a helical winding manner,
the plurality of helical layers include a plurality of low helical layers and a plurality of high helical layers with each of the helical layers being one of the low helical layer in which an inclination angle of the band-shaped fiber with respect to a longitudinal direction of the trunk portion is equal to or smaller than a first angle and the high helical layer in which the inclination angle of the band-shaped fiber with respect to the longitudinal direction of the trunk portion is larger than the first angle,
and
in at least two sequential low helical layers of the plurality of low helical layers in a layering direction, when the inclination angle of the band-shaped fiber is equal to or less than a second angle, a difference between a diameter of an opening formed in an end portion of a first layer of the at least two sequential low helical layers and a diameter of an opening formed in an end portion of a second layer of the at least two sequential low helical layers is equal to or greater than a width of the band-shaped fiber.

2. The high-pressure vessel according to claim 1, wherein the (i−1)-th low helical layer and the i-th low helical layer are continuously laminated.

3. The high-pressure vessel according to claim 1, wherein the (i−1)-th low helical layer and the i-th low helical layer are laminated via one or more of the fiber layers that do not contain any low helical layer.

4. The high-pressure vessel according to claim 1, wherein the diameter of the opening formed in the end portion of the low helical layer is determined by the inclination angle of the band-shaped fiber.

5. The high-pressure vessel according to claim 1, wherein the reinforcement layer includes:
an inner laminated portion on an inner peripheral side of the reinforcement layer, the inner laminated portion being formed by laminating a plurality of the low helical layers; and
an outer laminated portion on an outer peripheral side of the reinforcement layer, the outer laminated portion being formed by laminating a plurality of the low helical layers,
the inner laminated portion includes a beginning of winding of the band-shaped fiber around the liner,
the outer laminated portion includes an end of winding of the band-shaped fiber around the liner, and
an intermediate laminated portion formed by laminating at least one of the high helical layer and the hoop layer is provided between the inner laminated portion and the outer laminated portion.

6. The high-pressure vessel according to claim 5, wherein, in a graph in which a horizontal axis thereof represents a laminating order of the fiber layer and a vertical axis thereof represents the inclination angle of the band-shaped fiber forming the fiber layer,
when an inner section of the graph and an outer section of the graph are connected in a manner that an end point of the inner section and a start point of the outer section coincide with each other, the inner section and the outer section are substantially line-symmetric about a straight line passing through a coincident point of the end point and the start point and which is parallel to the vertical axis, wherein the inner section indicates a change in the inclination angle due to a change in the laminating order of the inner laminated portion, and the outer section indicates a change in the inclination angle due to a change in the laminating order of the outer laminated portion.

* * * * *